(12) United States Patent
Ruthinowski et al.

(10) Patent No.: US 10,518,740 B2
(45) Date of Patent: Dec. 31, 2019

(54) SEATBELT ASSEMBLY

(71) Applicant: FORD GLOBAL TECHNOLOGIES, LLC, Dearborn, MI (US)

(72) Inventors: Richard Edward Ruthinowski, Taylor, MI (US); Kevin M. Pline, Plymouth, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 177 days.

(21) Appl. No.: 15/906,106

(22) Filed: Feb. 27, 2018

(65) Prior Publication Data

US 2019/0263350 A1    Aug. 29, 2019

(51) Int. Cl.
*B60R 22/185*    (2006.01)
*A44B 11/25*     (2006.01)
*B60R 22/28*     (2006.01)
*B60R 22/18*     (2006.01)
*B60R 22/195*    (2006.01)

(52) U.S. Cl.
CPC ...... *B60R 22/1855* (2013.01); *A44B 11/2561* (2013.01); *B60R 22/28* (2013.01); *B60R 22/195* (2013.01); *B60R 2022/1806* (2013.01); *B60R 2022/1812* (2013.01); *B60R 2022/286* (2013.01)

(58) Field of Classification Search
CPC ............... B60R 22/1855; B60R 22/28; B60R 2022/286; B60R 2022/1812; B60R 22/195; B60R 2022/1806; A44B 11/2561
See application file for complete search history.

(56) References Cited

U.S. PATENT DOCUMENTS

| | | | |
|---|---|---|---|
| 5,100,176 A * | 3/1992 | Ball | A44B 11/2557 24/171 |
| 5,507,552 A | 4/1996 | Ineich et al. | |
| 5,806,148 A * | 9/1998 | McFalls | A44B 11/2561 24/168 |
| 5,870,816 A * | 2/1999 | McFalls | A44B 11/2553 24/170 |
| 7,325,280 B2 | 2/2008 | Ichida | |
| 8,172,267 B2 | 5/2012 | Eberle et al. | |
| 8,322,000 B2 * | 12/2012 | Dziengowski | A44B 11/2561 24/171 |

(Continued)

FOREIGN PATENT DOCUMENTS

| | | |
|---|---|---|
| JP | 2002211354 A | 7/2002 |
| JP | 4917510 B2 | 2/2012 |

(Continued)

*Primary Examiner* — Darlene P Condra
(74) *Attorney, Agent, or Firm* — Frank A. MacKenzie; MacMillan, Sobanski & Todd, LLC

(57) ABSTRACT

A seatbelt assembly and method of operating that includes a tongue assembly having a weblock and a secondary weblock mounted to a tongue selectively securable to a buckle; a webbing extending adjacent to the weblock and secondary weblock between a torso portion and a lap portion; and the weblock and secondary weblock allowing for the webbing to slide between the torso and lap portions when in unlocked positions and pivoting relative to the tongue such that the weblock and secondary weblock prevent the webbing from sliding between lap and torso portions in locked positions.

15 Claims, 7 Drawing Sheets

(56) References Cited

U.S. PATENT DOCUMENTS

| | | | |
|---|---|---|---|
| 8,813,316 B2* | 8/2014 | Richter | B60R 22/18 |
| | | | 24/168 |
| 10,182,622 B2* | 1/2019 | Knoedl | A44B 11/2557 |
| 2006/0214494 A1 | 9/2006 | Katayama | |
| 2006/0226694 A1 | 10/2006 | Higuchi et al. | |
| 2012/0068520 A1* | 3/2012 | McFalls | A44B 11/2553 |
| | | | 297/468 |
| 2012/0286501 A1 | 11/2012 | Goudeau et al. | |
| 2013/0341994 A1* | 12/2013 | Boughner | A44B 11/2561 |
| | | | 297/468 |
| 2018/0271225 A1* | 9/2018 | Urushibata | A44B 11/2561 |
| 2019/0135224 A1* | 5/2019 | Krambeck | B60R 22/1855 |

FOREIGN PATENT DOCUMENTS

| | | | |
|---|---|---|---|
| JP | 2012250558 A | 12/2012 | |
| JP | 2013018460 A | 1/2013 | |
| KR | 20110045716 | 5/2011 | |

\* cited by examiner

SEATBELT ASSEMBLY

BACKGROUND OF INVENTION

This invention relates to a seatbelt assembly employed in a vehicle, and in particular to a tongue assembly portion of a seatbelt assembly.

Seat belts in vehicles are used to restrain the occupants during vehicle impact events. Typically, the seat belt is arranged with a combination of a lap and shoulder belt, with the webbing extending through a tongue assembly for adjusting the amount of webbing between the portion extending across the lap and the portion extending across the torso of the vehicle occupant. While the webbing is adjustable between the lap and torso portions as one is putting-on the seat belt, during an impact event, the tongue assembly is generally configured to hold (i.e., lock) the webbing relative to each portion in order to fully support the vehicle occupant's lap and torso. Accordingly, it is desirable for the seat belt to provide good support for both the occupant's lap and the occupant's torso, and for the tongue to operate in such a way so as to assist in providing good support for both the lap and torso portions of the seat belt.

SUMMARY OF INVENTION

An embodiment contemplates a method of operating a seatbelt including allowing for webbing sliding between a lap portion and a torso portion through a tongue assembly when unlocked; and upon forces exerted by an occupant on the webbing, a weblock and a secondary weblock both locking the webbing from movement between the lap and torso portions.

An embodiment contemplates a seatbelt assembly including a tongue assembly having a weblock and a secondary weblock mounted to a tongue selectively securable to a buckle; a webbing extending adjacent to the weblock and secondary weblock between a torso portion and a lap portion; and the weblock and secondary weblock allowing for the webbing to slide between the torso and lap portions when in unlocked positions and pivoting relative to the tongue such that the weblock and secondary weblock prevent the webbing from sliding between lap and torso portions in locked positions.

An advantage is in maintaining seatbelt assembly comfort, ease of use and safety capabilities for vehicle occupants, while enhancing functionality of the seatbelt assembly. During a vehicle event where an occupant wearing the seatbelt pushes forward into the webbing, a weblock and secondary weblock of the tongue assembly locks the belt between torso portions and lap portions, which essentially prevents payout of the lap portion via the tongue assembly while allowing for a small amount of payout in the torso portion in order to potentially reduce chest deflection under such a loading condition.

DETAILED DESCRIPTION

Figure 1:
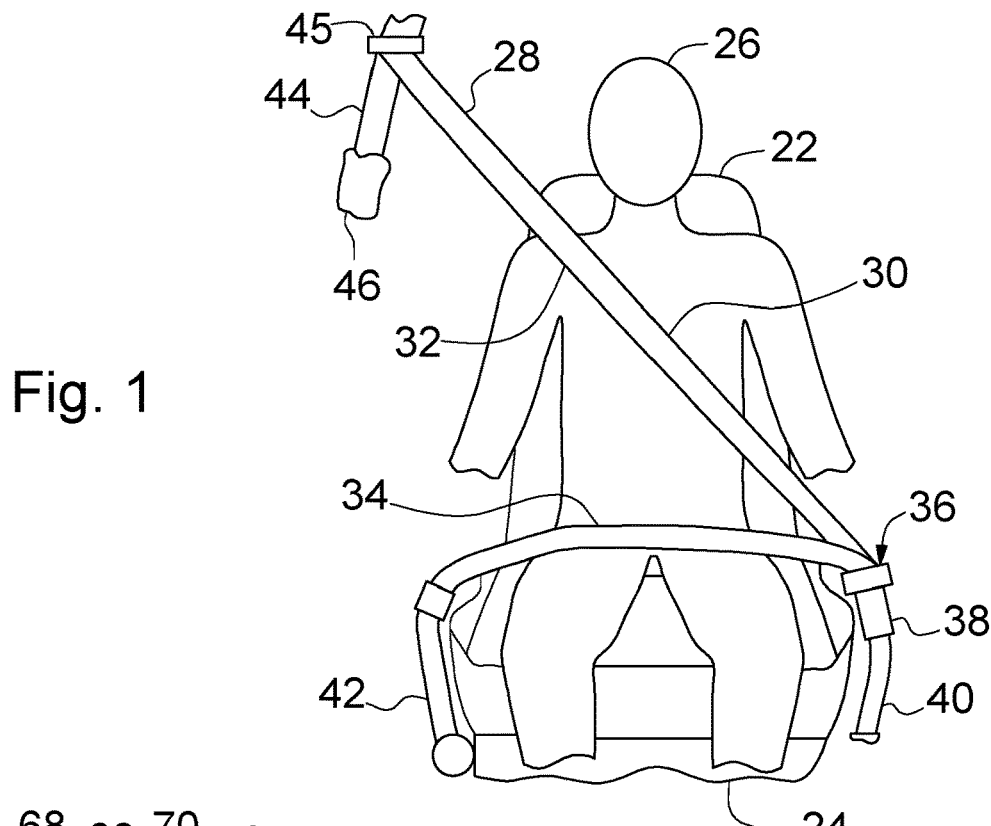
FIG. 1 is a schematic of a vehicle occupant seated in a vehicle seat, with a seat belt securing the occupant in place.

FIG. 1 shows a portion of a vehicle, having a vehicle seat 22 mounted to vehicle structure 24. An occupant 26 is shown sitting in the seat 22 and secured therein by a seatbelt 28, shown in the buckled condition.

The seat belt 28 includes webbing 30, which includes a torso portion 32 extending across the occupant's torso and a lap portion 34 extending across the occupant's hips. The webbing 30 extends through a tongue assembly 36 and is selectively slidable through this tongue assembly 36 between the lap portion 34 and the torso portion 32. The tongue assembly 36 is selectively secured to and released from a buckle (clasp) 38, which is secured, via a support 40, to the seat 22 or vehicle structure 24. The buckle 38 may be conventional and so is shown only schematically herein. An end 42 of the lap portion 34 of the webbing 30 is secured to the vehicle structure 24 or seat 22. Thus, when the tongue assembly 36 is locked to prevent webbing 30 from sliding through it, the lap portion 34 secures the occupant's hips in the seat 22.

The torso portion 32 of the webbing 30 has an end 44 that extends through a D-ring 45 into a retractor mechanism 46 (not shown in any detail herein as this assembly may be conventional) attached to the vehicle structure 24 (such as a vertical pillar of the vehicle). The retractor mechanism 46 may have inertial or other types of locks that selectively allow for feeding webbing to the torso portion 32 of the webbing 30 to allow for the occupant 26 to put on the seat belt but prevent (or extensively limit) feeding webbing during certain vehicle deceleration events. This type of operation of the retractor mechanism 46 may be conventional and so will not be discussed in further detail herein.

Figure 2:
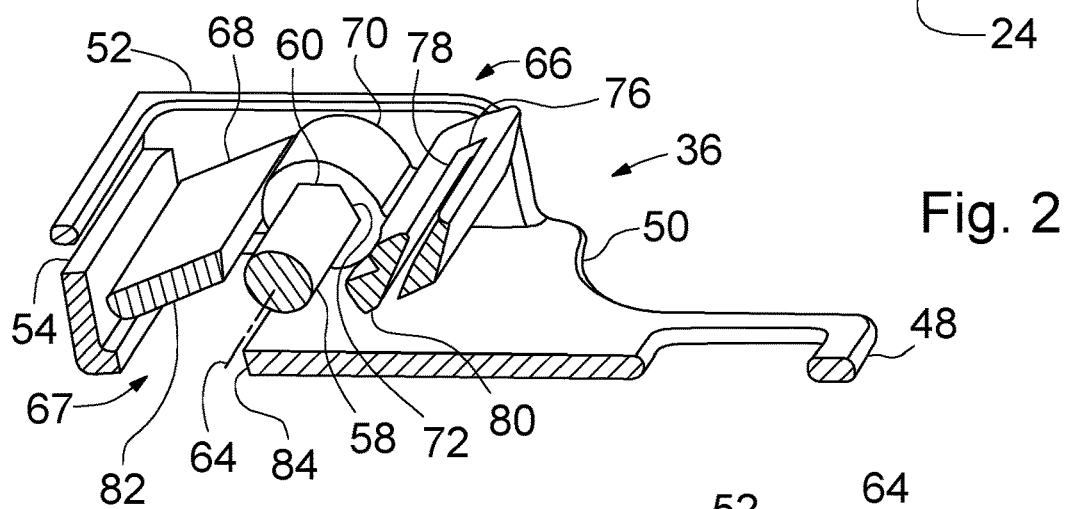
FIG. 2 is a schematic, perspective, partial cross-section view of a portion of a tongue assembly, with weblocks in unlocked positions.
Figure 3:
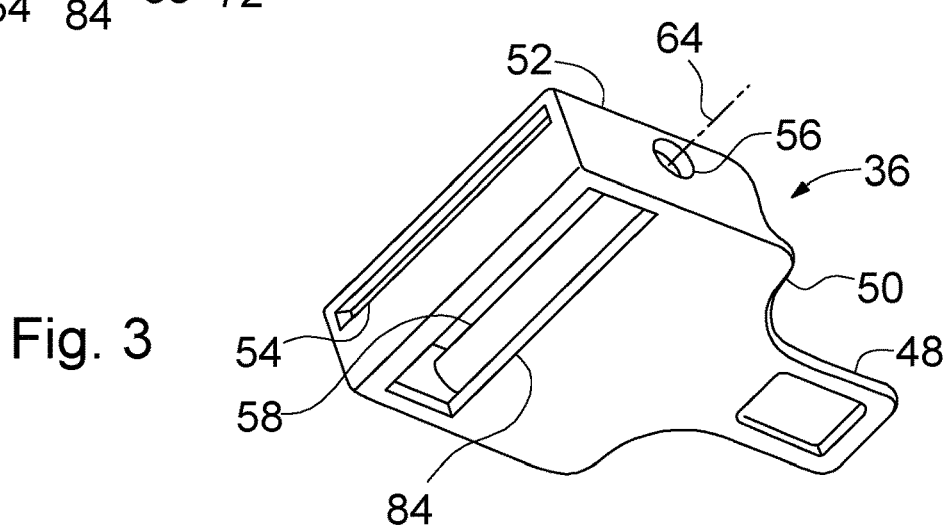
FIG. 3 is a schematic perspective view of a portion of the tongue assembly.
Figure 4:
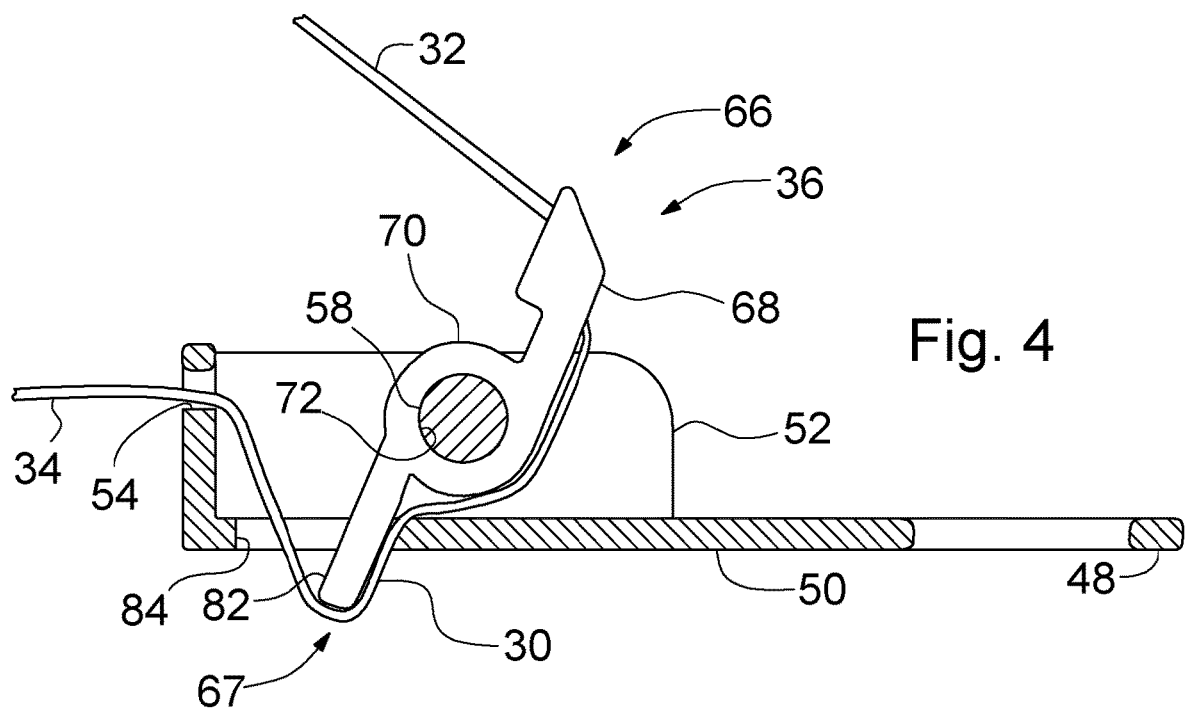
FIG. 4 is a schematic, side, partial cross section view of the tongue assembly and webbing, with the weblocks in a locked position.

Referring now to FIGS. 2-4 (with reference to FIG. 1), an embodiment of the tongue assembly 36 is shown. A tongue 48 of the tongue assembly 36 can be selectively locked into and released from the buckle 38. The tongue 48 and how it is secured to and released from the buckle 38 may be conventional and so will not be discussed further herein.

The tongue 48 may be a portion of or attached to a tongue plate 50, which has tongue walls 52 extending generally normal to the tongue plate 50. The tongue walls 52 may include a webbing guide slot 54, through which the webbing 30 slides, and a pair of tongue apertures 56, which may be circular or may be keyed such as in a hex shape.

A bar 58 extends into each tongue aperture 56 and may have a keyed (hexagonal) end 60 that his secured against rotation in one of the tongue apertures 56 and an opposed end that is secured in the other tongue aperture 56. This bar may define an axis 64 about which a weblock 66 and a secondary weblock 67 pivots.

The weblocks 66, 67 include a housing 68, which includes a pair of bar supports 70 having channels 72 through which the bar 58 extends. The channels 72 may be keyed to match corresponding keyed (e.g. hexagonal) portions of the bar 58, which would limit rotation of the bar 58 relative to the bar supports 70. The housing 68 also includes a webbing slot 76 through which the webbing 30 is guided.

The weblock 66 also includes a lock 78 having a lock feature 80, which locks the webbing 30 to the housing 68 to prevent feeding of the webbing 30 between the lap portion 34 and the torso portion 32 when the lock feature 80 is in a locked position. The lock feature 80 may be, for example, an angled surface adjacent to the webbing slot 76 and may include an engineered textured surface, with the textured surface engageable with the webbing 30 under certain operating conditions. The lock 78 may include a spring (not shown) to rotate the housing 68 and thus the lock feature 80 out of contact with the webbing 30 when the weblock 66 is not under a load from the occupant 26. The force of the spring, then, is overcome when the occupant 26 presses into the webbing 30, causing the housing 68 to rotate, which in turn causes the lock feature 80 to press against the webbing 30. This lock feature 80 pressing against the webbing 30 locks the webbing 30 from moving between the torso portion 32 and the lap portion 34.

The secondary weblock 67 is defined by a cantilevered flange 82 extending from the housing 68 toward the webbing guide slot 54 and a cutout 84 in the tongue plate 50 adjacent to the flange 82.

The operation of the tongue assembly 36 with weblock 66 will now be discussed relative to FIGS. 1-4. Under typical vehicle operating conditions when the seatbelt 28 is in the buckled position (shown in FIG. 1), there are minimal forces acting on the tongue assembly 36, in which case the housing 68 is angled so that the weblock 66 and the secondary weblock 67 do not engage the webbing 30 to prevent the webbing 30 from sliding between the torso portion 32 and the lap portion 34. This condition can be seen by the orientation of the housing 68 relative to the tongue plate 50 in FIG. 2. Since neither of the weblocks 66, 67 engage the webbing 30 in this condition, the webbing 30 is relatively free to slide between the torso portion 32 and the lap portion 34, allowing for comfort of the occupant 26.

In a vehicle operating condition where the vehicle occupant 26 is pushed forward into the webbing 30, the forces from the torso and lap of the occupant 26 act on the torso 32 and lap 34 portions, respectively, causing the housing 68 to pivot about the axis 64 of the bar 58 (shown in FIG. 4). This movement causes both of the weblocks 66, 67 press into the webbing 30, preventing the webbing 30 from sliding through the tongue assembly 36. Thus, the weblocks 66, 67 lock the webbing 30 in the tongue assembly 36, fixing which part of the webbing 30 is in the torso portion 32 and which part is in the lap portion 34. For the weblock 66, the pivoting of the housing 68 causes the webbing 30 to be secured relative to the webbing slot 76 due to the orientation of the webbing 30 relative to the slot 76. For the secondary weblock 67, the pivoting of the flange 82 into the cutout 84 captures the webbing 30 between the flange 82 and the edge of the cutout 84 in the tongue plate. The flange 82 may also create a displacement stop that prevents the housing 68 from rotating beyond the point at which the edge of the cutout 84 prevents the flange 82 from moving any farther.

The motion of the housing 68 between the position of FIGS. 2 and 4 causes the lap portion 34 to be drawn into the tongue assembly 36 by a small amount, thus providing additional initial restraint of the hips of the occupant 26. In addition, since the housing 68 pivots about the axis 64 of the bar 58 between the positions of FIGS. 2 and 4, this creates, in effect, a small amount of additional payout of the torso portion 32 of the webbing 30, while overall restraining movement of the occupant 26. As used herein, including in the claims, the term payout means providing webbing 30 in a way that provides additional slack in the lap portion 34 or the torso portion 32—this slack in the webbing (from payout) not coming from the ends of the webbing 30 but from the mechanical functioning of the tongue assembly 36.

Thus, this weblock 66 in the tongue assembly 36 allows for securing the occupant's hips while allowing for a small amount of payout of the torso portion 32 to allow for additional displacement of the occupant's torso, in a controlled manner, during a vehicle operating condition where the occupant is pushed into the seatbelt webbing 30. This may allow for reduced chest load and deflection of the occupant 26 during such vehicle events. The amount of payout may be controlled by the dimensions and stiffness of the various components of the tongue assembly 36, such as for example the length, diameter and/or material stiffness of the bar 58, as well as the sizing and/or material stiffness of the various portions of the housing 68.

As part of the weblocks 66, 67 allowing for a small amount of controlled torso portion 32 payout while providing a small amount of tensioning of the lap portion 34, some elements may have a flexing capability. This flexing capability may take the form of twisting, crushing (compressing), bending, rotating or other form of deformation. Thus, when using the term "flexing" herein, including in the claims, this may include such forms of deformation as just discussed above. This flexing is on a macro-scale, allowing for noticeable torso portion 32 payout, rather than a micro-scale (as every material subjected to a force has some deformation, at least on a microscopic scale).

For example, the housing 68 may be formed from an elastomeric material that allows for bending when a tension load is applied to the torso portion 32. With such an arrangement, if the bar 58 has the keyed end 60 in a keyed tongue aperture 56 to prevent that end of the bar 58 from rotating relative to the tongue plate 50, and at least one of the channels 72 in the bar supports 70 are keyed to align with a keyed section of the bar 58, then the bar supports 70 may have minimal rotation relative to the bar 58 under torso portion loading. In such a case, the housing 68, under a loading of the torso portion 32, flexes adjacent to the bar supports 70, providing for the small payout of the torso portion 32 when the weblock 66 is locked. Additionally, the flange 82 may be elastomeric and also provide some flexing when the occupant 26 is pressed into the webbing 30. Such flexing may help to soften any load peak of the webbing 30 pressing against the occupant 26.

In another example, the bar 58 may be formed from an elastomeric material that allows for twisting of the bar 58 when the torso portion 32 is loaded while the weblock 66 is locked. With such an arrangement, the bar 58 has the keyed end 60 in a keyed tongue aperture 56 to prevent that end of the bar 58 from rotating relative to the tongue plate 50, and at least one of the channels 72 in the bar supports 70 are keyed to align with a keyed section of the bar 58, then the bar supports 70 may have minimal rotation relative to the bar 58 under torso portion loading. In such a case, the bar 58, under a loading of the torso portion 32 flexes by twisting about the axis 64, allowing for a rotation of the housing 68, which in turn, provides for a small payout of the torso portion 32 when the weblock 66 is locked.

The present embodiment of FIGS. 1-4 preferably has both an elastomeric housing 68 and elastomeric bar 58, in which case, both elements provide some flexing, which results in the small amount of payout of the torso portion 32, and a small amount of retraction in the lap portion 34. They amount of force/torsion needed to cause the bending in the housing 68 and the twisting in the bar 58 can be set at different levels of force/torque imparted to the webbing 30. In such a case, the flexing may occur sequentially rather than simultaneously with the housing 68 and bar 58. Although, if one does not wish to have the flexing of both the housing 68 and bar 58, then one may configure one or the other to be stiff while only the other is flexible under seatbelt loading conditions. The dimensional geometry of the components may be set for the particular application in order to achieve the desired amount of torso portion payout.

The functioning of the weblocks 66, 67 may alternatively be sequential where an initial rotation of the housing 68 causes the weblock 66 to lock the webbing 30 between the torso portion 32 and the lap portion 34, with additional rotation of the housing 68 causing the secondary weblock 67 to lock as the weblock 66 is releasing the webbing 30. The webbing still remains locked throughout the process where the occupant 26 is pushed into the webbing 30, but allow for a load rebalancing for the webbing 30 relative to the housing 68.

Figure 5:
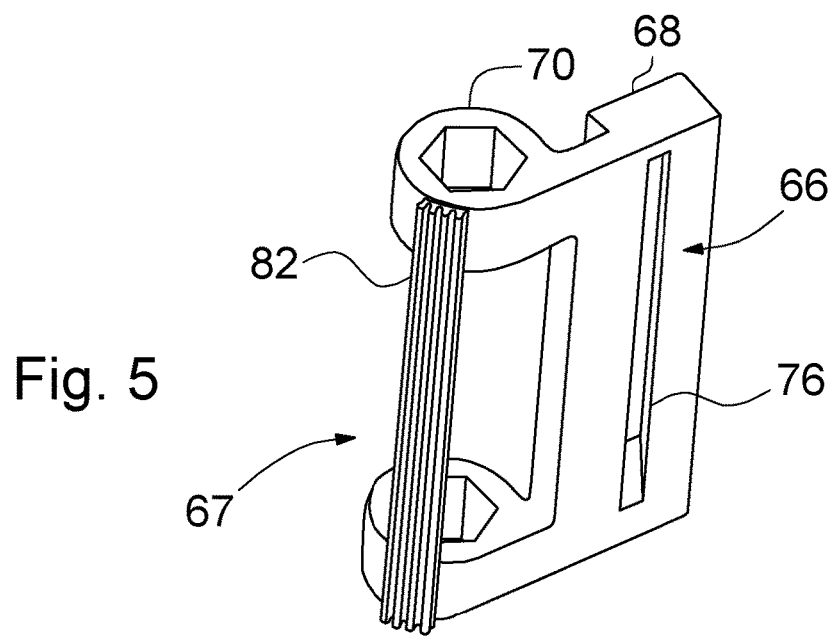
FIG. 5 is a schematic, perspective view of a housing of the tongue assembly, with a modified secondary weblock.
Figure 6:
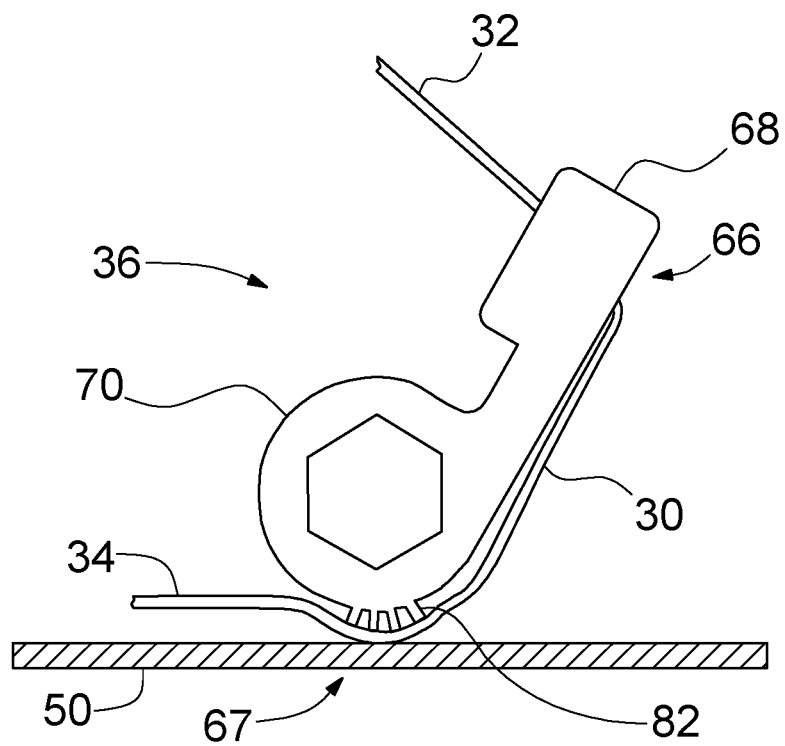
FIG. 6 is a schematic, partial cross-sectional, side view of the housing, webbing and tongue plate, with weblocks of FIG. 5 shown in a locked position.

FIGS. 5 and 6 (discussed with reference to FIG. 1) illustrate the tongue assembly 36, with alternative weblocks 66, 67. In this embodiment, the weblock 66 may be similar to the previous embodiment, with the webbing slot 76 engaging the webbing 30 when the housing 68 is rotated. The secondary weblock 87 may be made up of multiple relatively small, flexible flanges 82 extending from the bar supports 70. The flanges 82 are located so that they are generally not in contact with the webbing 30 and tongue plate 50 when the occupant 26 is not applying a significant force against the webbing 30. Under the vehicle condition, though, where the occupant 26 is applying force to the webbing 30, the housing 68 rotates about the bar, causing the flanges 82 to press the webbing 30 against the tongue plate 50 (see FIG. 6). This creates the secondary weblock 67 that prevents webbing 30 from sliding between the torso portion 32 and the lap portion 34.

As with the first embodiment, either or both of the bar and housing may be the component(s) that flex(es), resulting in the small amount of payout of the torso portion 32 when the weblocks 86, 87 are in a locked position. The operation, then, is essentially the same as in the first embodiment, and so will not be repeated here. This flexing of the bar and/or housing is applicable to all of the embodiments herein and so will not be discussed further.

Also, as with the first embodiment, the two weblocks 86, 87 may act to both lock the webbing 30, or the locking may be sequential. That is, an initial rotation of the housing 68 causes the weblock 66 to lock the webbing 30 between the torso portion 32 and the lap portion 34, with additional rotation of the housing 68 causing the secondary weblock 67 to lock as the weblock 66 is releasing the webbing 30. The webbing still remains locked throughout the process where the occupant 26 is pushed into the webbing 30, but allow for a load rebalancing for the webbing 30 relative to the housing 68.

Figure 7:
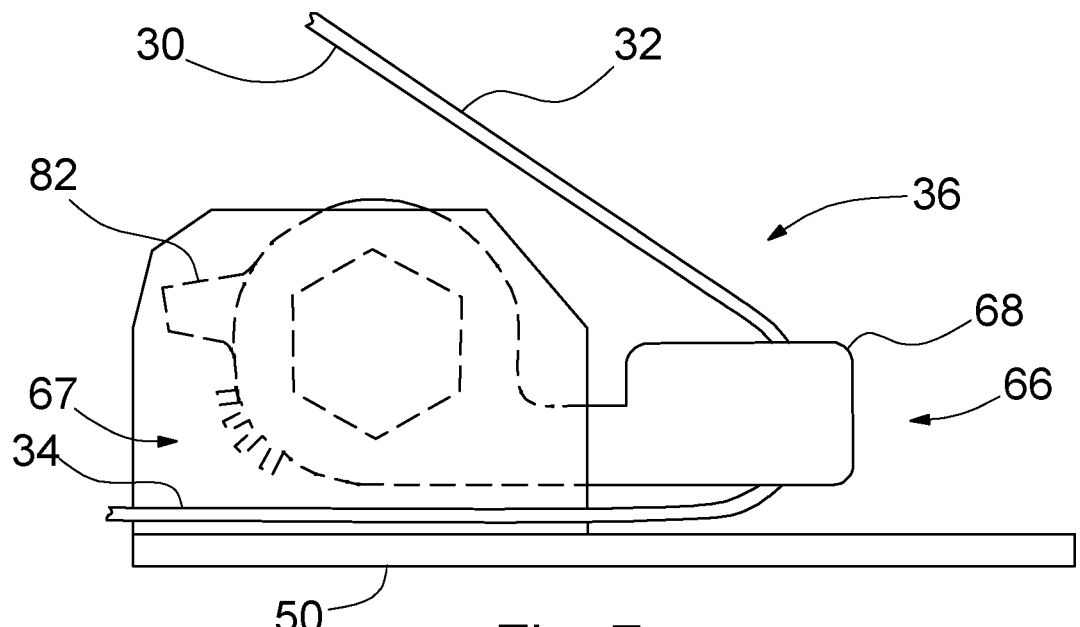
FIG. 7 is a schematic, side view of a portion of the tongue assembly similar to FIG. 6, but with a modified secondary weblock and with the weblocks in unlocked positions.
Figure 8:
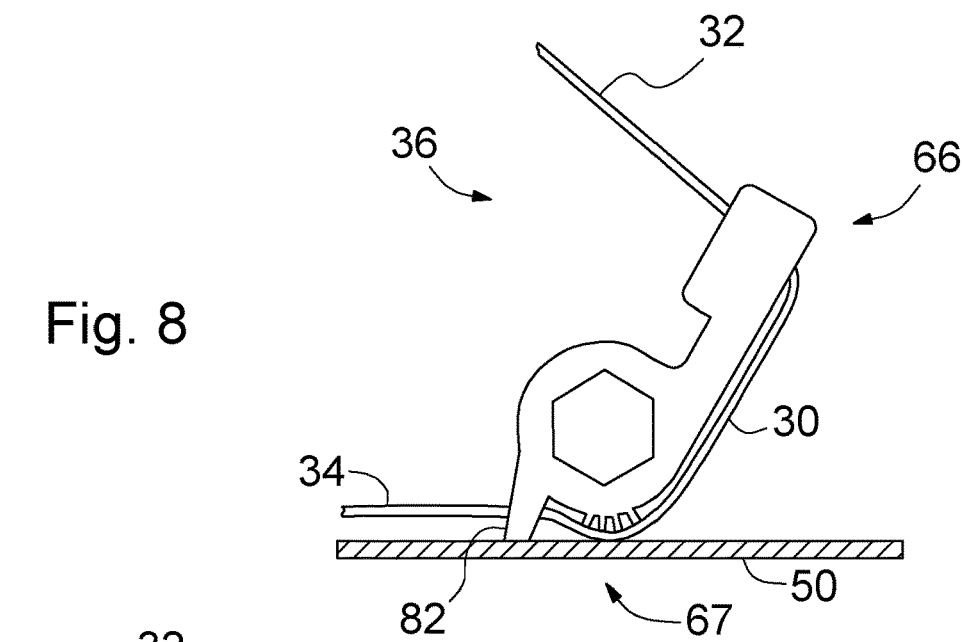
FIG. 8 is a view similar to FIG. 7, but with the weblocks shown in locked positions.

FIGS. 7 and 8 (discussed with reference to FIG. 1) illustrate the tongue assembly 36, with alternative weblocks 66, 67 and cantilevered flange 82 for stopping rotation of the housing 68. The weblocks 66, 67 may be the same as those in FIGS. 5 and 6, and so will not be discussed further. FIG. 7 shows the weblocks 66, 67 in unlocked positions, while FIG. 8 shows the weblocks 66, 67 in locked positions.

In this embodiment, one or more cantilevered flanges 82 may extend from the bar supports 70 and act as a rotation stop. The flanges 82 create a displacement stop that prevents the housing 68 from rotating beyond the point at which the flanges 82 contact the tongue plate 50 (see FIG. 8).

Figure 9:
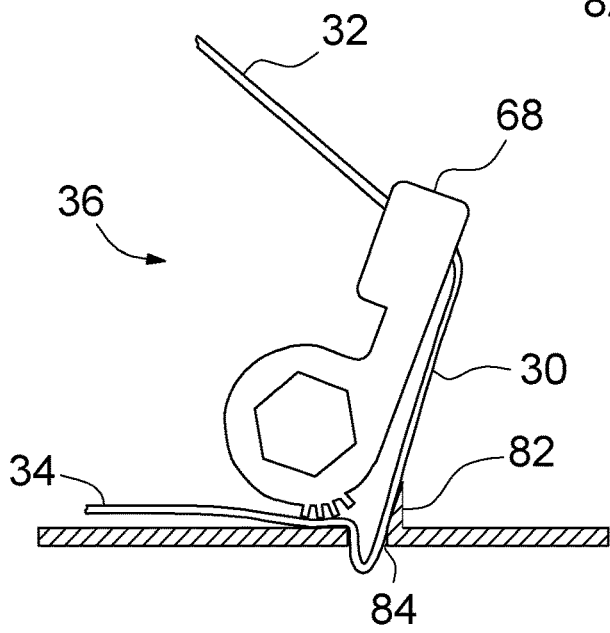
FIG. 9 is a view similar to FIG. 6, but with a modified secondary weblock, and being in shown in a locked position.

FIG. 9 (discussed with reference to FIG. 1) illustrates the tongue assembly 36, with alternative weblocks 66, 67 and cantilevered flange 82 for stopping rotation of the housing 68. The weblocks 66, 67 may be essentially the same as those in FIGS. 5 and 6, and so will not be discussed further—although, additionally, the tongue plate 50 provides cutouts 84 that can receive excess webbing 30 during the locking process.

Figure 10:
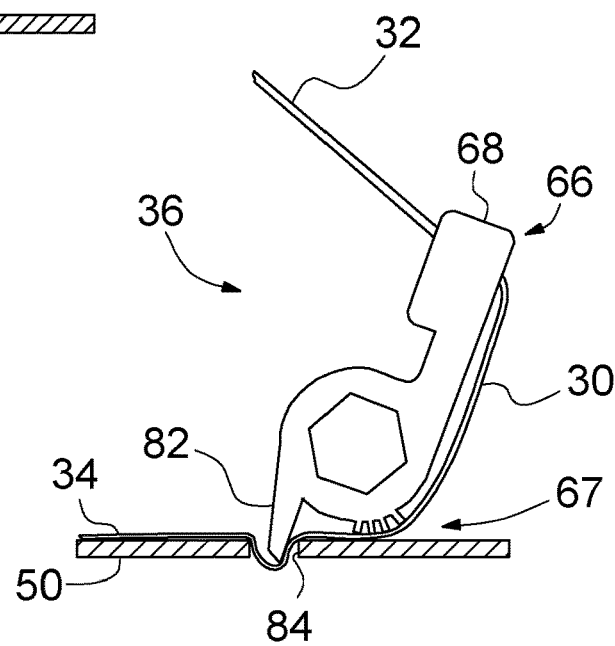
FIG. 10 is a view similar to FIG. 6, but with a modified secondary weblock, and being shown in a locked position.

FIG. 10 (discussed with reference to FIG. 1) illustrates the tongue assembly 36, with alternative weblocks 66, 67 and cantilevered flange 82 for stopping rotation of the housing 68. This embodiment is similar to that of FIGS. 7 and 8, but with a cutout 84 in the tongue plate 50, which receives the flange 82 when the weblocks 86, 87 are in their locked positions.

Figure 11:
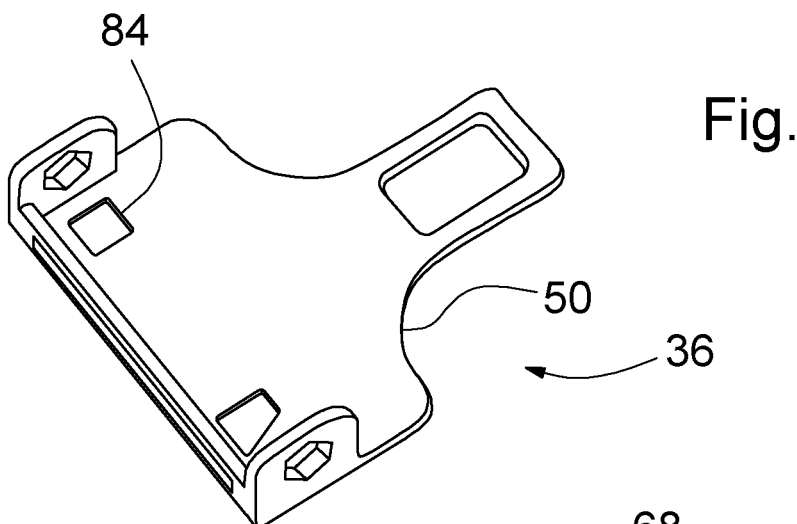
FIG. 11 is a schematic, perspective view of a tongue having notches for a secondary weblock.
Figure 12:
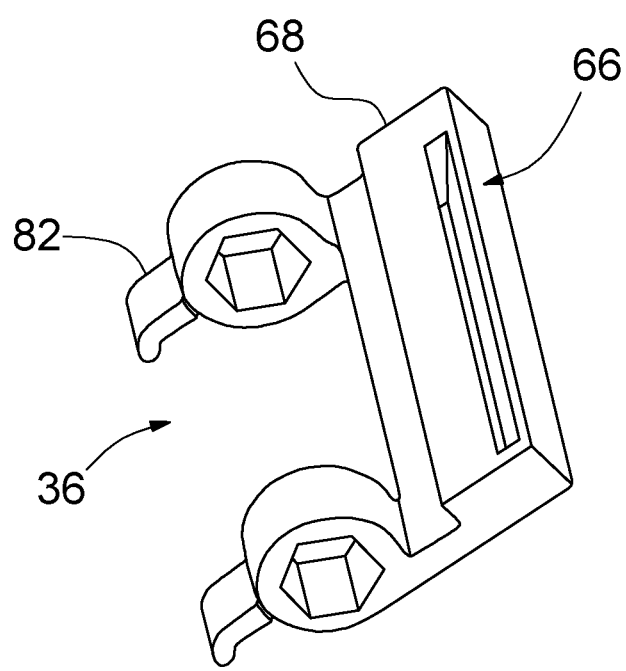
FIG. 12 is a schematic, perspective view of a housing having a modified secondary weblock employed with the tongue of FIG. 11.

FIGS. 11 and 12 (discussed with reference to FIG. 1) illustrate the tongue assembly 36, with alternative weblock 66 and cantilevered flanges 82 for stopping rotation of the housing 68. In this embodiment, the flanges 82 are outside of a width of the webbing 30 and thus act as a rotation stop without a secondary weblock. However, the weblock 66 is employed, as well as limiting the rotation of the housing 68 in order to provide the desired torso portion payout 32 and loading of the webbing 30 on the occupant 26.

As the occupant 26 is pushed into the webbing 30, the housing 68 rotates relative to the tongue plate 50, which causes the weblock 66 to engage the webbing 30, thus preventing from moving between the torso portion 32 and the lap portion 34. Also, as the housing rotates 68 far enough, the flanges 82 will engage the tongue plate 50, via a pair of cutouts 84, thus preventing further rotation of the housing 68.

Figure 13:
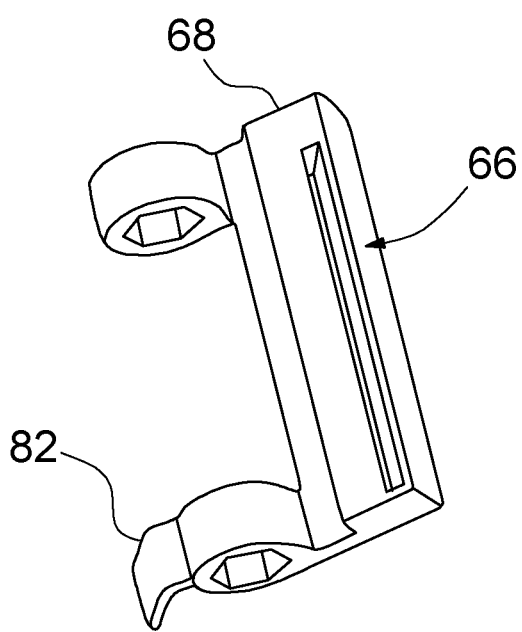
FIG. 13 is a view similar to FIG. 13, but having a modified secondary weblock.

FIG. 13 (discussed with reference to FIG. 1) illustrates the housing 68, with alternative weblock 66 and cantilevered flange 82 for stopping rotation of the housing 68. This embodiment is similar to that in FIGS. 11 and 12, but with only one flange 82 for stopping rotation of the housing 68, rather than two flanges.

Figure 14:
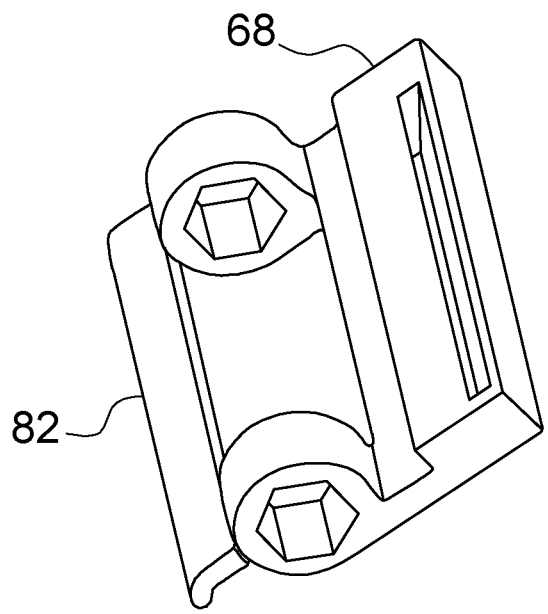
FIG. 14 is a view similar to FIG. 12, but having a modified secondary weblock.

FIG. 14 (discussed with reference to FIG. 1) illustrates the housing 68, with alternative weblocks 66, 67 and cantilevered flange 82 for stopping rotation of the housing 68. This embodiment is similar to that of FIGS. 2-4, but with the flange 82 having a somewhat different shape, being angled toward the tongue plate at the cantilevered end.

Figure 15:
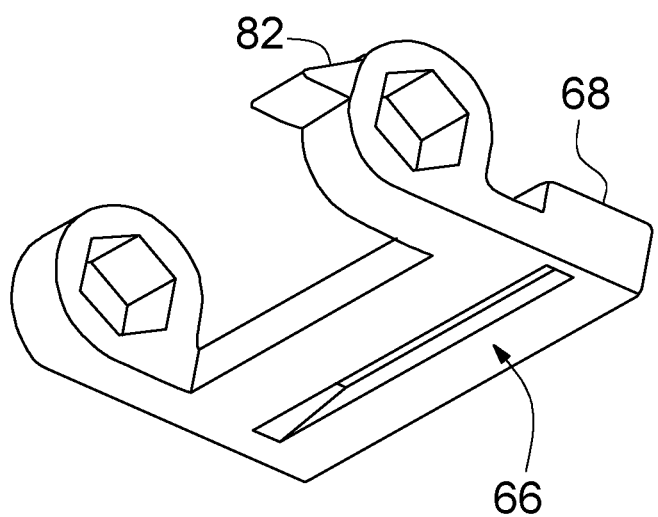
FIG. 15 is a view similar to FIG. 12, but having a modified secondary weblock.
Figure 16:
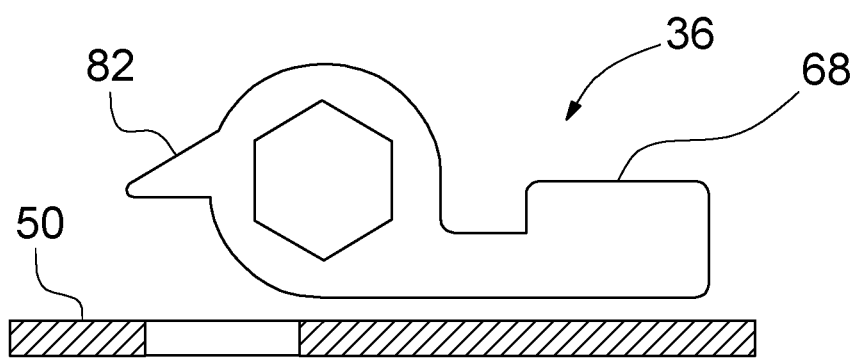
FIG. 16 is a schematic, partial cross-section, side view of the housing of FIG. 15, shown mounted relative to a tongue.
Figure 17:
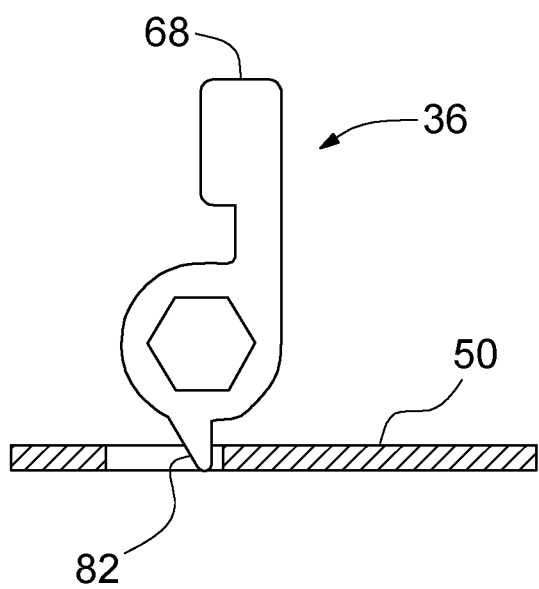
FIG. 17 is a view similar to FIG. 16, but with the weblocks shown in a locked position.

FIGS. 15-17 (discussed with reference to FIG. 1) illustrate the tongue assembly 36, with alternative weblock 66 and cantilevered flange 82 for stopping rotation of the housing 68. This embodiment is similar to that of FIG. 13, but with a straight, tapering flange 82, rather than a flange angled at the cantilevered end. FIG. 16 shows the orientation of the housing 68 relative to the tongue plate 50 when in the unlocked position, while FIG. 17 shows the orientation of the housing 68 relative to the tongue plate 50 when in the webbing locked position.

Figure 18:
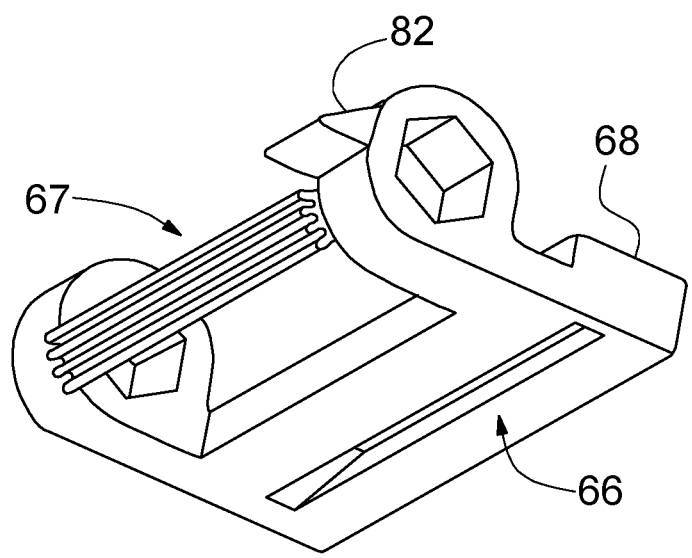
FIG. 18 is a view similar to FIG. 15, but with a modified secondary weblock.

FIG. 18 (discussed with reference to FIG. 1) illustrates the housing 68, with alternative weblocks 66, 67 and cantilevered flange 82 for stopping rotation of the housing 68. This embodiment is similar to that of FIG. 10, but with the flange 82 laterally outward from the webbing.

Figure 19:
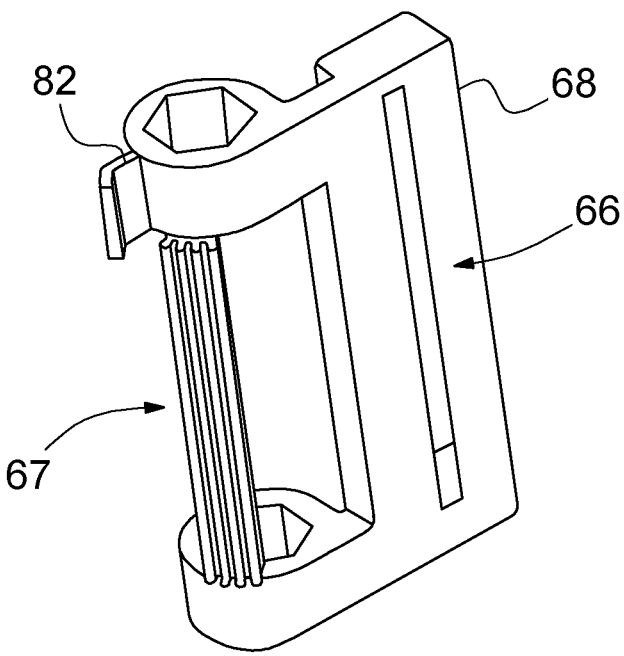
FIG. 19 is a view similar to FIG. 13, but with a modified secondary weblock.

FIG. 19 (discussed with reference to FIG. 1) illustrates the housing 68, with alternative weblocks 66, 67 and cantilevered flange 82 for stopping rotation of the housing 68. This embodiment is similar to that of FIG. 18, but with a different shaped flange 82 that is angled at the cantilevered end rather than being a straight, tapered flange 82.

While certain embodiments of the present invention have been described in detail, those familiar with the art to which this invention relates will recognize various alternative designs and embodiments for practicing the invention as defined by the following claims.

The invention claimed is:

1. A method of operating a seatbelt comprising:
    allowing for webbing sliding between a lap portion and a torso portion through a tongue assembly when unlocked; and
    upon forces exerted by an occupant on the webbing, a weblock and a secondary weblock both locking the webbing from movement between the lap and torso portions, wherein, in the locked position, the weblock flexes to provide payout in the torso Portion.

2. The method of claim 1, with the weblock and secondary weblock locking the webbing simultaneously.

3. The method of claim 1, with the weblock initially locking the webbing upon the forces exerted by the occupant and the secondary weblock locking the webbing as the weblock releases the webbing due to the exerted forces by the occupant increasing on the webbing.

4. The method of claim 1 wherein the weblock includes a bar secured to a tongue plate and a housing secured to the bar, with the housing pivoting relative to the tongue plate, changing the weblock and secondary weblock from the unlocked to locked positions.

5. The method of claim 1 wherein the secondary weblock engages the webbing to retract webbing from the lap portion in the locked position.

6. The method of claim 1 wherein the secondary weblock includes a pivotable flange pushing the webbing through a cutout in a tongue plate to lock the webbing in the locked position.

7. The method of claim 1 wherein the secondary weblock includes pivotable flanges compressing the webbing against a tongue plate, locking the webbing in the locked position.

8. The method of claim 1 wherein the weblock includes a bar secured to a tongue plate and a housing secured to the bar, with the housing pivoting relative to the tongue plate, changing the weblock and secondary weblock from to locked positions, and the bar flexing to provide payout in the torso portion.

9. A seatbelt assembly comprising:
    a tongue assembly having a weblock and a secondary weblock mounted to a tongue selectively securable to a buckle;
    a webbing extending adjacent to the weblock and secondary weblock between a torso portion and a lap portion; and
    the weblock and secondary weblock allowing for the webbing to slide between the torso and lap portions when in unlocked positions and pivoting relative to the tongue such that the weblock and secondary weblock prevent the webbing from sliding between lap and torso portions in locked positions, wherein the tongue assembly includes a bar secured to the tongue and a housing secured to the bar such that the housing is pivotable relative to the tongue, the weblock including a flange having a slot through which the webbing extends, with the slot selectively engaging the webbing to lock the webbing in the slot.

10. The seatbelt of claim 9 wherein the secondary weblock includes a second flange extending into contact with the webbing and pivotable through a cutout in the tongue to selectively engage the webbing between the second flange and an edge of the cutout.

11. The seatbelt of claim 9 wherein the secondary weblock includes secondary flanges extending into contact with the webbing and pivotable toward the tongue to selectively press the webbing between the secondary flanges and the tongue.

12. The seatbelt of claim 9 wherein the housing is elastomeric, and with the housing flexing when the weblock is in the locked position to allow payout of the torso portion.

13. The seatbelt of claim 12 wherein the secondary weblock engages the webbing to retract webbing from the lap portion in the locked position.

14. The seatbelt of claim 9 wherein the secondary weblock engages the webbing to retract webbing from the lap portion in the locked position.

15. A method of operating a seatbelt comprising:
    allowing for webbing sliding between a lap portion and a torso portion through a tongue assembly when unlocked; and
upon forces exerted by an occupant on the webbing, a weblock and a secondary weblock both locking the webbing from movement between the lap and torso portions, with the weblock initially locking the webbing upon the forces exerted by the occupant and the secondary weblock locking the webbing as the weblock releases the webbing due to the exerted forces by the occupant increasing on the webbing.

\* \* \* \* \*